(12) United States Patent
Wu et al.

(10) Patent No.: US 8,243,036 B2
(45) Date of Patent: Aug. 14, 2012

(54) DISPLAY APPARATUS AND TOUCH DETECTION METHOD FOR THE SAME

(75) Inventors: Wen-Hao Wu, Hsin-Chu (TW); Hsueh-Ying Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 506 days.

(21) Appl. No.: 12/547,476

(22) Filed: Aug. 25, 2009

(65) Prior Publication Data
US 2010/0214256 A1    Aug. 26, 2010

(51) Int. Cl.
*G06F 3/041* (2006.01)
(52) U.S. Cl. .......... 345/173; 345/174; 345/87; 349/106; 349/157
(58) Field of Classification Search .......... 345/173, 345/174
See application file for complete search history.

(56) References Cited

U.S. PATENT DOCUMENTS

| | | | |
|---|---|---|---|
| 6,795,142 B2 * | 9/2004 | Chae et al. | 349/106 |
| 6,982,770 B2 * | 1/2006 | Lim et al. | 349/44 |
| 7,414,697 B1 * | 8/2008 | Choi et al. | 349/192 |
| 7,525,078 B2 * | 4/2009 | Fann | 250/208.1 |
| 7,920,244 B2 * | 4/2011 | Kang et al. | 349/157 |
| 2003/0090603 A1 * | 5/2003 | Chae et al. | 349/43 |
| 2003/0117538 A1 * | 6/2003 | Lim et al. | 349/43 |
| 2005/0128404 A1 * | 6/2005 | Lee | 349/141 |
| 2007/0109239 A1 | 5/2007 | den Boer et al. | |
| 2007/0290971 A1 | 12/2007 | Shih et al. | |
| 2010/0013785 A1 * | 1/2010 | Murai et al. | 345/173 |

* cited by examiner

*Primary Examiner* — Van Chow
(74) *Attorney, Agent, or Firm* — Chun-Ming Shih (57) ABSTRACT

An exemplary display apparatus includes a plurality of pixel units, a plurality of gate lines, a readout line and a plurality of touch control units. The gate lines are for deciding whether to enable the pixel units. Each of the touch control units is electrically coupled to the readout line and a corresponding one of the gate lines and includes a switching element. When one of the touch control units is touched, the switching element of the touched touch control unit is turn on, and thereby a waveform on the gate line corresponding to the touched touch control unit is coupled to the readout line and a position of the touched touch control unit is determined according to a timing sequence of a waveform on the readout line. The present invention also provides a touch detection method adapted to be implemented on the above-mentioned display apparatus.

3 Claims, 9 Drawing Sheets

DISPLAY APPARATUS AND TOUCH DETECTION METHOD FOR THE SAME

CROSS-REFERENCE TO RELATED APPLICATIONS

This application is based upon and claims the benefit of priority from the prior Taiwanese Patent Application No. 098105848, filed Feb. 24, 2009, the entire contents of which are incorporated herein by reference.

BACKGROUND

1. Technical Field

The present invention generally relates to display apparatuses capable of performing touch screen functions and touch detection methods for the display apparatuses.

2. Description of the Related Art

A touch screen introduces a novel interface for human-machine communications, it is more intuitive in use and in line with human nature. Traditional touch screen technology uses an additional ITO (indium-tin-oxide) module to detect signals and thus has the drawbacks of high cost, low contrast and increased module thickness. In order to overcome the above-mentioned drawbacks, several solutions of touch control function directly integrated into panel manufacture of display apparatus have been proposed, and wherein a press-type touch screen has the advantages of immunity to the ambient light disturbance and in line with human intuition for use. There are several approaches to acquire a pressed position for the press-type touch screen, for example, obtaining a signal by detecting a common voltage delivered from a color filter substrate during which is pressed to be in contact with a thin film transistor array substrate, to acquire a pressed position; or using a potential difference generated by a change of liquid crystal capacitance in conjunction with an common voltage swing effect to acquire a pressed position. However, the above-mentioned approaches are incapable of performing a multi-touch detection function, and thus the applications are limited.

BRIEF SUMMARY

The present invention relates to a display apparatus capable of performing a touch screen function and achieving a multi-touch detection.

The present invention further relates to a touch detection method.

In order to achieve the above-mentioned advantages, a display apparatus in accordance with an embodiment of the present invention is provided. The display apparatus includes a plurality of pixel units, a plurality of gate lines, a readout line and a plurality of touch control units. The gate lines are for deciding whether to enable the pixel units. Each of the touch control units is electrically coupled to the readout line and a corresponding one of the gate lines and includes a switching element. When one of the touch control units is touched, the switching element of the touched touch control unit is turned on, and thereby a waveform on the gate line corresponding to the touched touch control unit is coupled to the readout line and a position of the touched touch control unit is determined according to a timing sequence of a waveform on the readout line.

In one embodiment, each of the touch control units further includes a sensing capacitance and a liquid crystal capacitance electrically coupled with the sensing capacitance in series, a first terminal of the sensing capacitance is electrically coupled to the corresponding one of the gate lines, a second terminal of the sensing capacitance is coupled to a predetermined voltage through the liquid crystal capacitance, and the second terminal of the sensing capacitance further is electrically coupled to the readout line through the switching element.

In an alternative embodiment, each of the touch control units further includes a thin film transistor. The first source/drain electrode is electrically coupled to the corresponding one of the gate lines, the second source/drain electrode of the thin film transistor is electrically coupled to the readout line, and the gate electrode of the thin film transistor is adapted to couple a predetermined voltage through the switching element. Moreover, the first source/drain electrode of the thin film transistor is electrically coupled to the corresponding one of the gate lines though a sensing capacitance.

A touch detection method in accordance with an embodiment of the present invention is provided. The touch detection method is adapted to be implemented on a display apparatus. The display apparatus includes a plurality of pixel units, a plurality of gate lines, a readout line and a plurality of touch control units. The gate lines are for deciding whether to enable the pixel units. Each of the touch control units is electrically coupled to the readout line and a corresponding one of the gate lines. The touch detection method includes the steps of: when at least one of the touch control units is touched, coupling a waveform of each of at least one of the gate lines corresponding to the at least one touched touch control unit to the readout line; and determining a position of each of the at least one touched touch control unit according to a timing sequence of a waveform on the readout line.

In one embodiment, the touch detection method further includes the step of: determining the amount of the at least one touched touch control unit according to a pulse amount in a predetermined time interval of the waveform on the readout line.

In another embodiment, the touch detection method further includes the step of: determining a touching time of the at least one touched touch control unit according to a pulse amount of the waveform on the readout line corresponding to the waveform on the same gate line.

A display apparatus in accordance with another embodiment of the present invention is provided. The display apparatus includes a first substrate and a second substrate. The second substrate and the first substrate have a liquid crystal layer sandwiched therebetween. The first substrate includes a gate line, a readout line and a conductive body. The conductive body and the gate line have a dielectric layer sandwiched therebetween and whereby a sensing capacitance is formed. The conductive body is preset to be electrically unconnected with the readout line. The second substrate includes an electrode layer and a conductive connecting member electrically insulated from the electrode layer. The electrode layer and the conductive body have a liquid crystal capacitance formed therebeween due to the existence of the liquid crystal layer between the electrode layer and the conductive body. The liquid crystal capacitance is electrically coupled with the sensing capacitance in series. When an external force is applied on the conductive connecting member, the conductive connecting member enables the conductive body and the readout line to be electrically coupled with each other and thereby a waveform on the gate line is coupled to the readout line. Furthermore, the conductive connecting member is structured to include a projection member projecting from the second substrate and a conductive layer covering the projection member.

A display apparatus in accordance with still another embodiment of the present invention is provided. The display apparatus includes a first substrate and a second substrate. The second substrate and the first substrate have a liquid crystal layer sandwiched therebetween. The first substrate includes a gate line, a readout line and a thin film transistor. The first source/drain electrode of the thin film transistor is electrically coupled to the gate line, and the second source/drain electrode of the thin film transistor is electrically coupled to the readout line. The second substrate includes a conductive connecting member. The conductive connecting member is preset to be electrically unconnected with the gate electrode of the thin film transistor. When an external force is applied on the conductive connecting member, the connecting member is electrically connected with the gate electrode of the thin film transistor to supply a predetermined voltage to turn on the thin film transistor and thereby a waveform on the gate line is coupled to the readout line. Furthermore, the first source/drain electrode of the thin film transistor and the gate line have a dielectric layer sandwiched therebetween and whereby a sensing capacitance is formed. The conductive connecting member can be structured to include a projection member projecting from the second substrate and a conductive layer covering the projection member.

In the above-mentioned embodiments of the present invention, when at least one of the touch control units is touched, by way of coupling the waveform(s) of the corresponding gate line(s) to the readout line, the position, the amount and/or the touching time of the at least one touched control unit can be determined according to the waveform on the readout line. For example, determining the position(s) of the at least one touched touch control unit according to a timing sequence of the waveform on the readout line, determining the amount of the at least one touched touch control unit according to a pulse amount in a predetermined time interval of the waveform on the readout line, and determining the touching time of the at least one touched touch control unit according to a pulse amount of the waveform on the readout line corresponding to a waveform on the same gate line. Accordingly, the display apparatuses and touch detection method in accordance with the above-mentioned embodiments can achieve multi-touch detection and thus the applications are greatly enhanced.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
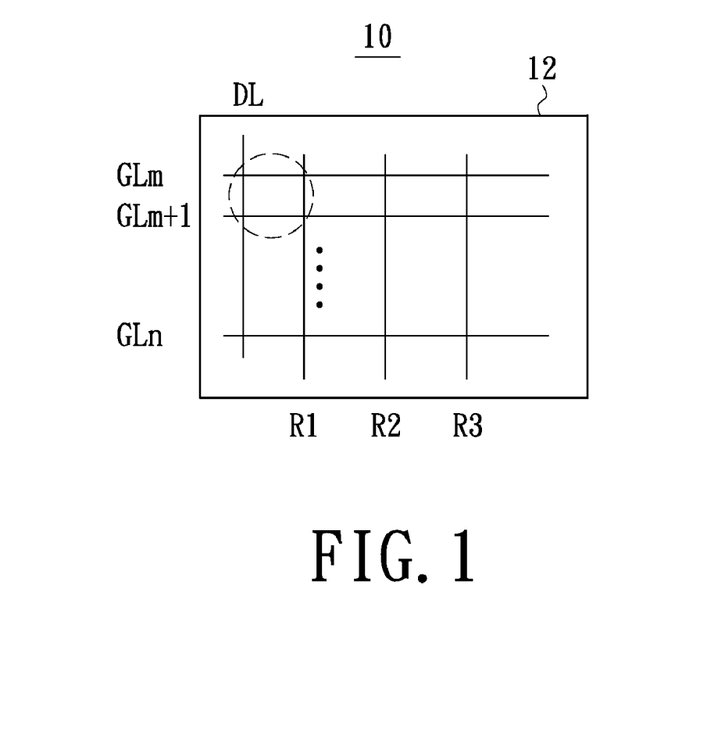
FIG. 1 is a schematic partial view of a display apparatus in accordance with an embodiment of the present invention.

Referring to FIG. 1, a schematic partial view of a display apparatus in accordance with an embodiment of the present invention is shown. The display apparatus 10 includes a thin film transistor array (hereinafter also refer to as "TFT array") substrate 12, a color filter substrate (not shown in FIG. 1) and a liquid crystal layer (not shown in FIG. 1) sandwiched between the TFT array substrate 12 and the color filter substrate.

As illustrated in FIG. 1, the TFT array substrate 12 has a plurality of gate lines GLm, GLm+1, . . . , GLn, a plurality of data lines DL (only one is illustrated in FIG. 1 for the purpose of illustration) and a plurality of readout lines R1, R2, R3. The data lines DL are arranged intersecting with the gate lines GLm, GLm+1, . . . , GLn. The readout lines R1, R2, R3 are arranged substantially in parallel with the data lines DL.

Figure 2:
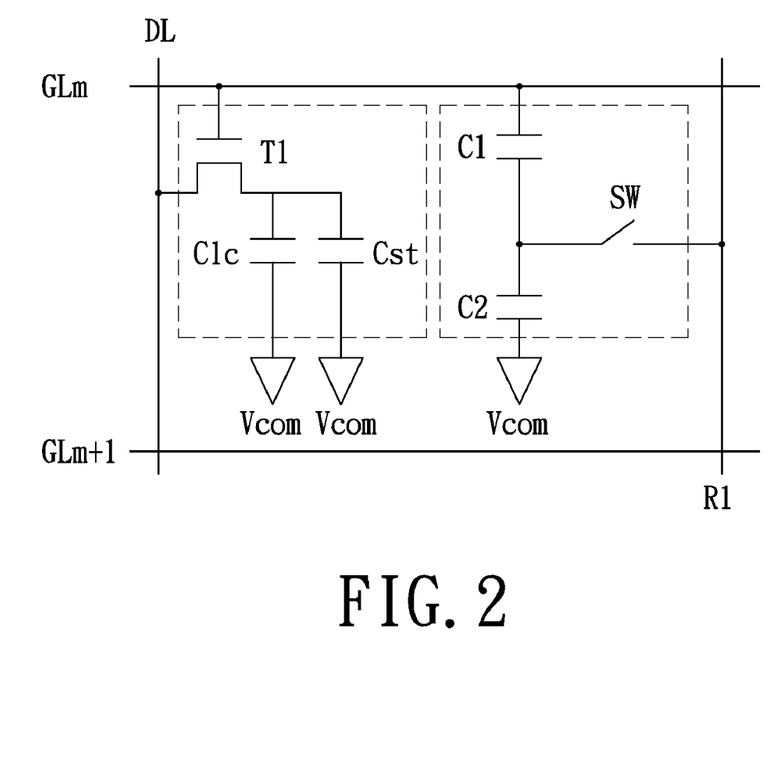
FIG. 2 is a schematic enlarged view of a portion denoted by a dashed circle in FIG. 1, in accordance with a first embodiment of the present invention.

Referring to FIG. 2, a schematic enlarged view of a portion denoted by a dashed circle in FIG. 1, in accordance with a first embodiment of the present invention, is shown. An intersecting location of the data line DL and the gate line GLm has a pixel unit (as denoted by the dashed rectangle on the left side in FIG. 2). The pixel unit includes a thin film transistor T1, a storage capacitance Cst and a liquid crystal capacitance Clc. The gate electrode of the thin film transistor T1 is electrically coupled to the gate line GLm, the drain electrode of the thin film transistor T1 is electrically coupled to the data line DL. The storage capacitance Cst and the liquid crystal capacitance Clc are coupled with each other in parallel and both are electrically coupled between the source electrode of the thin film transistor T1 and a predetermined voltage Vcom (which is a common voltage in the present embodiment). An intersecting location of the readout line R1 and the gate line GLm has a touch control unit (as denoted by the dashed rectangle on the right side in FIG. 2). The touch control unit includes a switching element SW, a sensing capacitance C1 and a liquid crystal capacitance C2 electrically coupled with the sensing capacitance C1 in series. One terminal of the sensing capacitance C1 is electrically coupled to the gate line GLm. Another terminal of the sensing capacitance C1 is coupled to the predetermined voltage Vcom through the liquid crystal capacitance C2 and electrically coupled to the readout line R1 through the switching element SW.

Figure 3A:
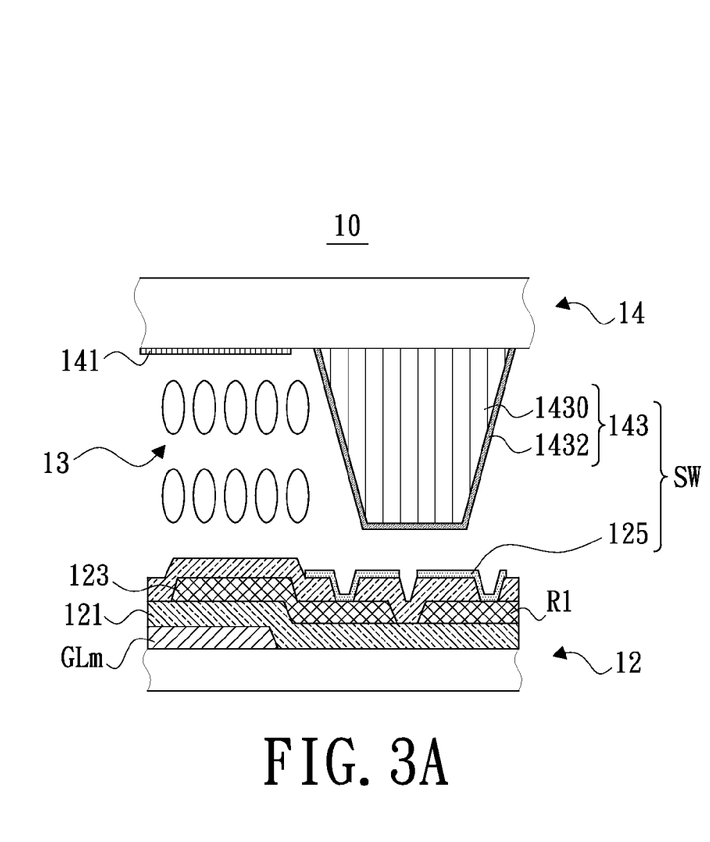
FIGS. 3A and 3B are schematic and partially structural views of the display apparatus in FIG. 1, in accordance with the first embodiment of the present invention.
Figure 3B:
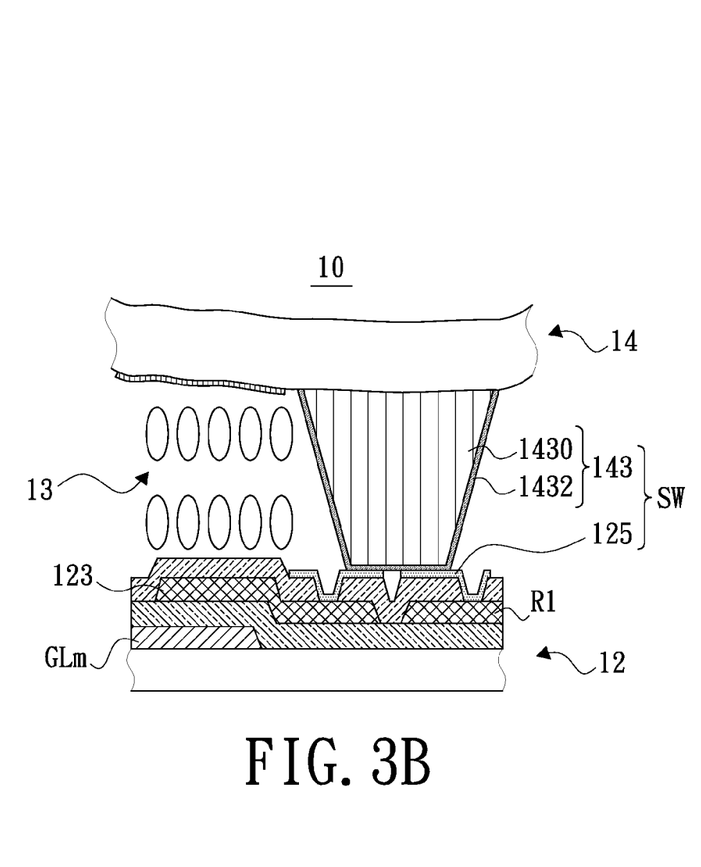

Referring to FIGS. 3A and 3B, schematic and partially structural views of the display apparatus 10 in accordance with the first embodiment of the present invention are shown. As illustrated in FIG. 3A, the TFT array substrate 12 has the gate line GLm, the readout line R1, a dielectric layer 121, a conductive body 123 and a discontinuous conductive layer 125 formed thereon. The gate line GLm and the conductive body 123 have the sensing capacitance C1 as illustrated in FIG. 2 formed therebetween due to the existence of the dielectric layer 121 interposed between the gate line GLm and the conductive body 123. A portion of the discontinuous conductive layer 125 is electrically coupled with the conductive body 123 and another portion of the discontinuous conductive layer 125 is electrically coupled with the readout line R1. Since the conductive layer 125 is discontinuous and thus the conductive body 123 is preset to be electrically unconnected with the readout line R1. The color filter substrate 14 and the TFT array substrate 12 together have a liquid crystal layer 13 sandwiched therebetween. The color filter substrate 14 has an electrode layer 141 and a conductive connecting member 143 formed thereon. The electrode layer 141 acts as a common electrode (e.g., ITO common electrode) and thus can supply the predetermined voltage Vcom. The electrode layer 141 and the conductive body 123 formed on the TFT array substrate 12 have the liquid crystal capacitance C2 as illustrated in FIG. 2 formed therebeween due to the existence of the liquid crystal layer 13 between the electrode layer 141 and the conductive body 123. The conductive connecting member 143 and the electrode layer 141 are electrically insulated from each other. The conductive connecting member 143 and the discontinuous conductive layer 125 formed on the TFT array substrate 12 together form the switching element SW as illustrated in FIG. 2. In the illustrated embodiment, the conductive connecting member 143 is structured to include a projection member 1430 projecting from the color filter substrate 14 and a conductive layer 1432 covering the projection member 1430. The conductive layer 1432 can be an ITO layer.

As illustrated in FIG. 3B, when an external force is applied on the conductive connecting member 143, the conductive connecting member 143 enables the portions of the discontinuous conductive layer 125 respectively electrically coupled to the conductive body 123 and the readout line R1 to be electrically connected with each other (i.e., the switching element SW as illustrated in FIG. 2 is turn on), and thereby the conductive body 123 and the readout line R1 are electrically communicated with each other and thus a waveform on the gate line GLm is coupled to the readout line R1.

Figure 4:
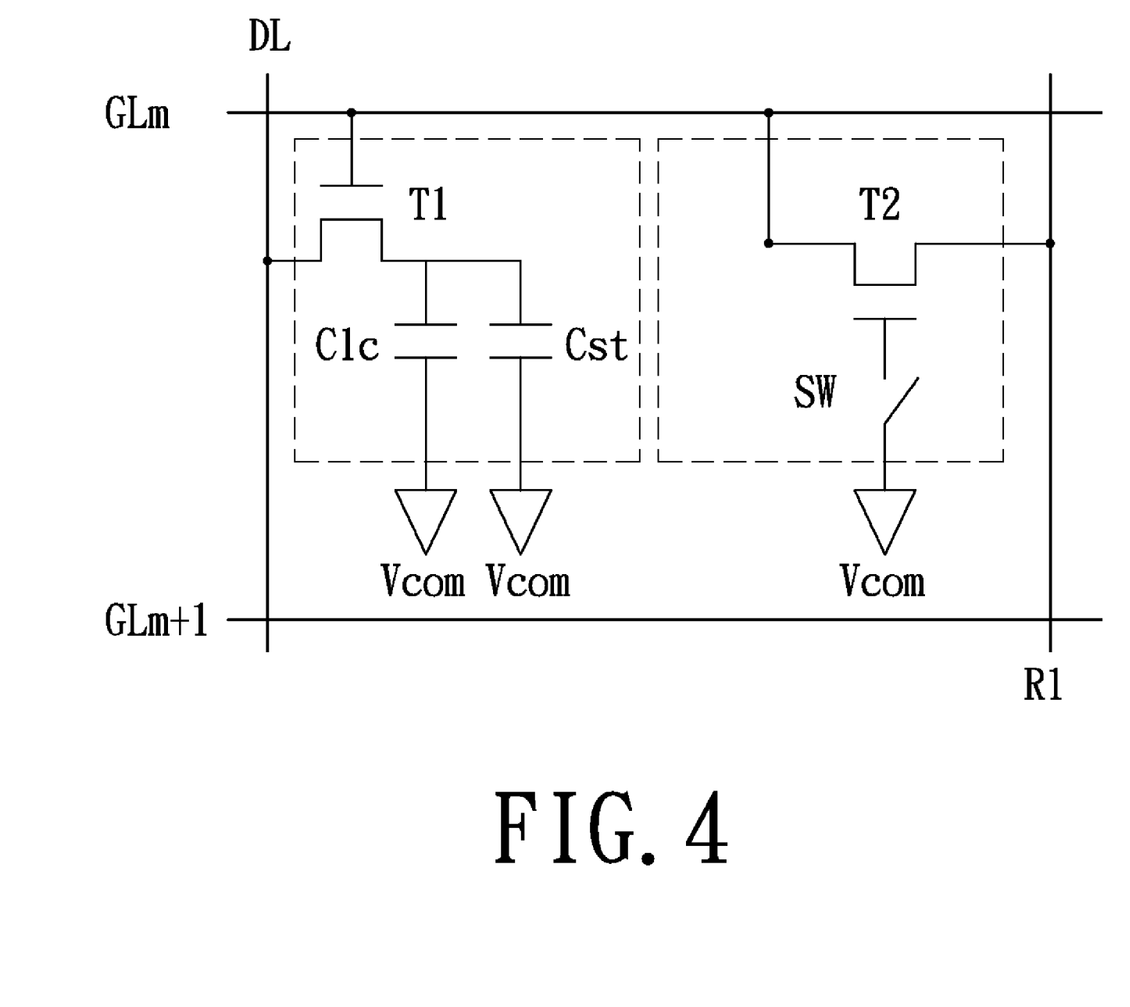
FIG. 4 is a schematic enlarged view of the portion denoted by the dashed circle in FIG. 1, in accordance with a second embodiment of the present invention.

Referring to FIG. 4, a schematic enlarged view of the portion as denoted by the dashed circle in FIG. 1, in accordance with a second embodiment of the present invention, is shown. As illustrated in FIG. 4, the intersecting location of the data line DL and the gate line GLm has a pixel unit (as denoted by the dashed rectangle on the left side in FIG. 4). The pixel unit includes a thin film transistor T1, a storage capacitance Cst and a liquid crystal capacitance Clc. The gate electrode of the thin film transistor T1 is electrically coupled to the gate line GLm, and the drain electrode of the thin film transistor T1 is electrically coupled to the data line DL. The storage capacitance Cst and the liquid crystal capacitance Clc are electrically coupled with each other in parallel and both coupled between the source electrode of the thin film transistor T1 and a predetermined voltage Vcom (which is a common voltage in the present embodiment). The intersecting location of the readout line R1 and the gate line GLm has a touch control unit (as denoted by the dashed rectangle on the right side in FIG. 4). The touch control unit includes a switching element SW and a thin film transistor T2. The source electrode of the thin film transistor T2 is electrically coupled to the gate line GLm, the drain electrode of the thin film transistor T2 is electrically coupled to the readout line R1, and the gate electrode of the thin film transistor T2 is adapted to couple the predetermined voltage Vcom through the switching element SW.

Figure 5A:
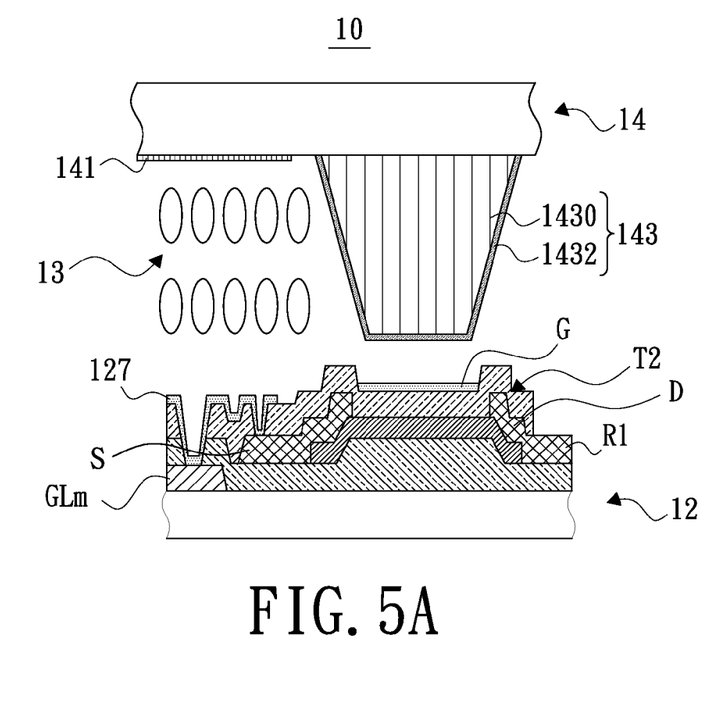
FIGS. 5A and 5B are schematic and partially structural views of the display apparatus in FIG. 1, in accordance with the second embodiment of the present invention.
Figure 5B:
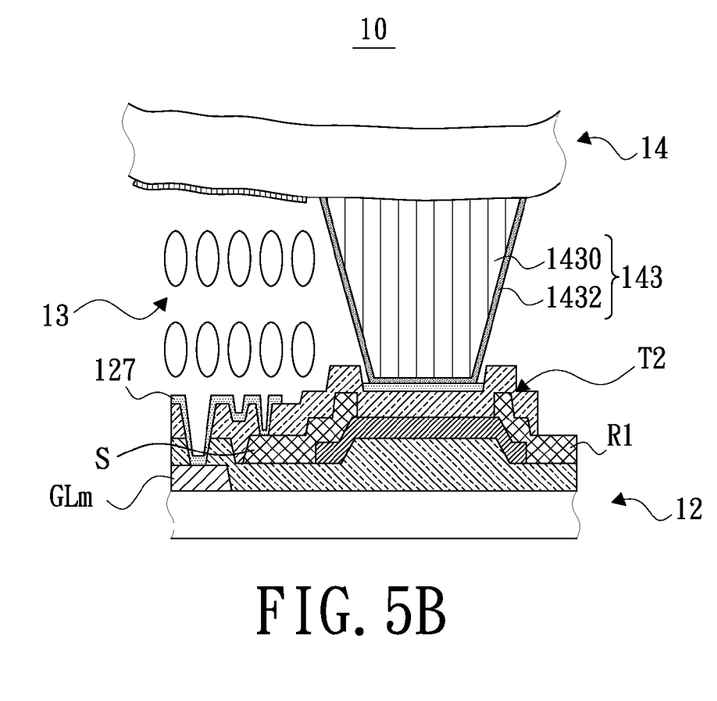

Referring to FIGS. 5A and 5B, schematic and partially structural views of the display apparatus 10, in accordance with the second embodiment of the present invention, are shown. As illustrated in FIG. 5A, the TFT array substrate 12 has the gate line GLm, the readout line R1, the thin film transistor T2 and a conductive layer 127. The source electrode S of the thin film transistor T2 is electrically coupled to the gate line GLm through the conductive layer 127, and the drain electrode D of the thin film transistor T2 is electrically coupled to the readout line R1. The color filter substrate 14 and the TFT array substrate 12 have the liquid crystal layer 13 sandwiched therebetween. The color filter substrate 14 has an electrode layer 141 and a conductive connecting member 143 formed thereon. The electrode layer 141 acts as a common electrode (e.g., ITO common electrode) and thus can supply the predetermined voltage Vcom. The conductive connecting member 143 and the electrode layer 141 are electrically insulated from each other. The conductive connecting member 143 and the gate electrode G of the thin film transistor T2 together form the switching element SW as illustrated in FIG. 4. The conductive connecting member 143 is preset to be electrically unconnected with the gate electrode G of the thin film transistor T2. In the present embodiment, the conductive connecting member 143 is structured to include a projection member 1430 projecting from the color filter substrate 14 and a conductive layer 1432 covering the projection member 1430. The conductive layer 1432 can be an ITO layer.

As illustrated in FIG. 5B, when an external force is applied on the conductive connecting member 143, the conductive connecting member 143 and the gate electrode G of the thin film transistor T2 are electrically communicated with each other (i.e., the switching element SW as illustrated in FIG. 4 is turn on) to supply the predetermined voltage Vcom to turn on the thin film transistor T2, and thereby a waveform on the gate line GLm is coupled to the readout line R1.

Figure 6:
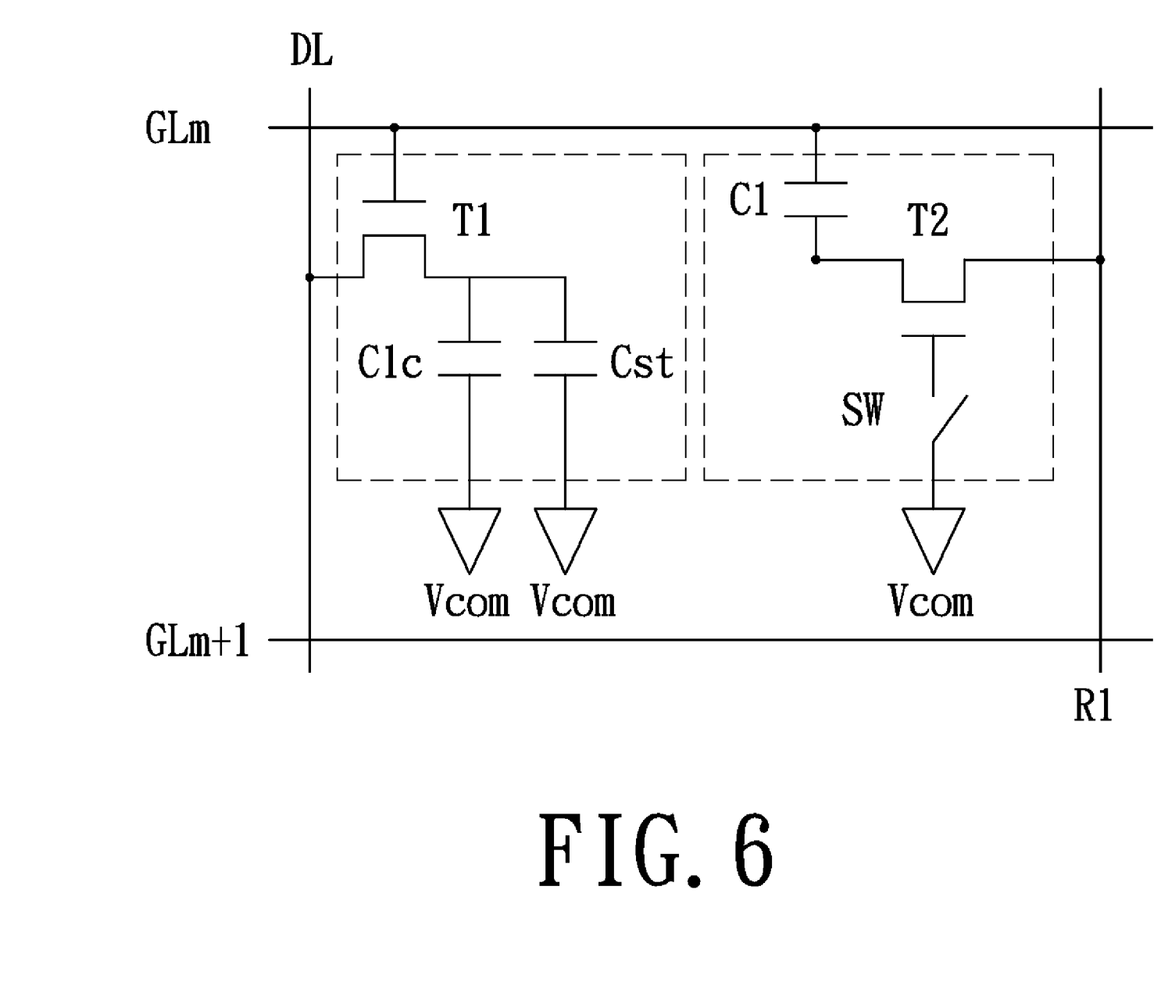
FIG. 6 is a schematic enlarged view of the portion denoted by the dashed circle in FIG. 1, in accordance with a third embodiment of the present invention.

Referring to FIG. 6, a schematic partial view of the portion as denoted by the dashed circle in FIG. 1, in accordance with a third embodiment of the present invention, is shown. As illustrated in FIG. 6, similar to the illustration of FIG. 4, the intersecting location of the data line DL and the gate line GLm has a pixel unit (as denoted by the dashed rectangle on the left side in FIG. 6). The pixel unit includes a thin film transistor T1, a storage capacitance Cst and a liquid crystal capacitance Clc. The intersecting location of the readout line R1 and the gate line GLm has a touch control unit (as denoted by the dashed rectangle on the right side in FIG. 6). The touch control unit includes a switching element SW and a thin film transistor T2. However, the source electrode of the thin film transistor T2 as illustrated in FIG. 6 is electrically coupled to the gate line GLm through a sensing capacitance C1, rather than directly coupled to the gate line GLm like the illustration of FIG. 4.

Figure 7A:
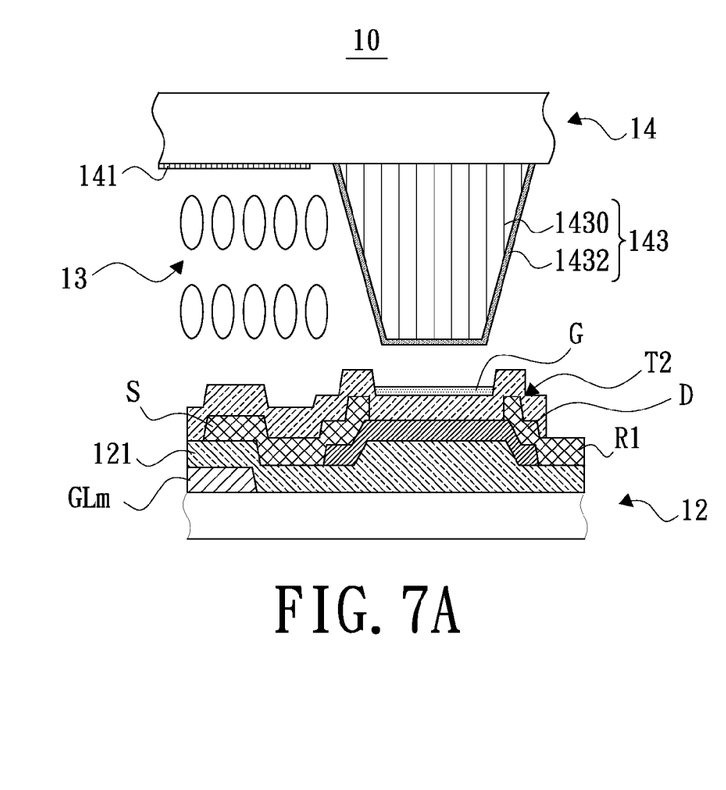
FIGS. 7A and 7B are schematic and partially structural views of the display apparatus in FIG. 1, in accordance with the third embodiment of the present invention.
Figure 7B:
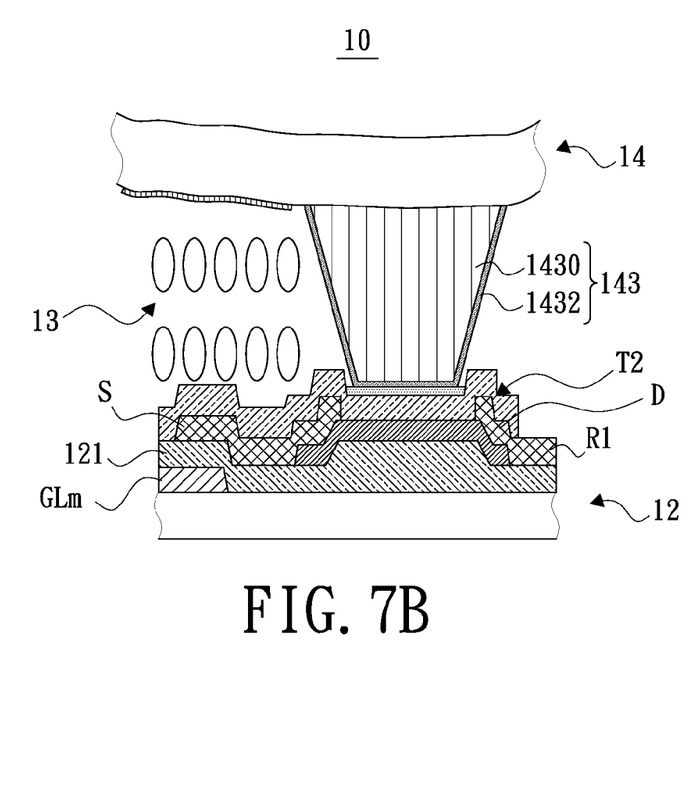

Referring to FIGS. 7A and 7B, schematic and partially structural views of the display apparatus 10, in accordance with the third embodiment of the present invention, are shown. As illustrated in FIG. 7A, the TFT array substrate 12 has the gate line GLm, the readout line R1, the thin film transistor T2 and a dielectric layer 121 formed thereon. The source electrode S of the thin film transistor T2 and the gate line GLm have the sensing capacitance C1 as illustrated in FIG. 6 formed therebeween due to the existence of the dielectric layer 121 sandwiched between the source electrode S and the gate line GLm. The drain electrode D of the thin film transistor T2 is electrically coupled to the readout line R1. The color filter substrate 14 and the TFT array substrate 12 have the liquid crystal layer 13 sandwiched therebetween. The color filter substrate 14 has a electrode layer 141 and a conductive connecting member 143. The electrode layer 141 acts as a common voltage (e.g., ITO common voltage) and thus can supply the predetermined voltage Vcom. The conductive connecting member 143 and the electrode layer 141 are electrically insulated from each other. The conductive connecting member 143 and the gate electrode G of the thin film transistor T2 together form the switching element SW as illustrated in FIG. 6. The conductive connecting member 143 is preset to be electrically unconnected with the gate electrode G of the thin film transistor T2. In the present embodiment, the conductive connecting member 143 is structured to include a projection member 1430 projecting from the color filter substrate 14 and a conductive layer 1432 covering the projection member 1430. The conductive layer 1432 can be an ITO layer.

As illustrated in FIG. 7B, when an external force is applied on the conductive connecting member 143, the conductive connecting member 143 is electrically communicated with the gate electrode G of the thin film transistor T2 (i.e., the switching element SW as illustrated in FIG. 6 is turn on) to supply the predetermined voltage Vcom to turn on the thin film transistor T2, and thereby a waveform on the gate line GLm is coupled to the readout line R1.

Figure 8:
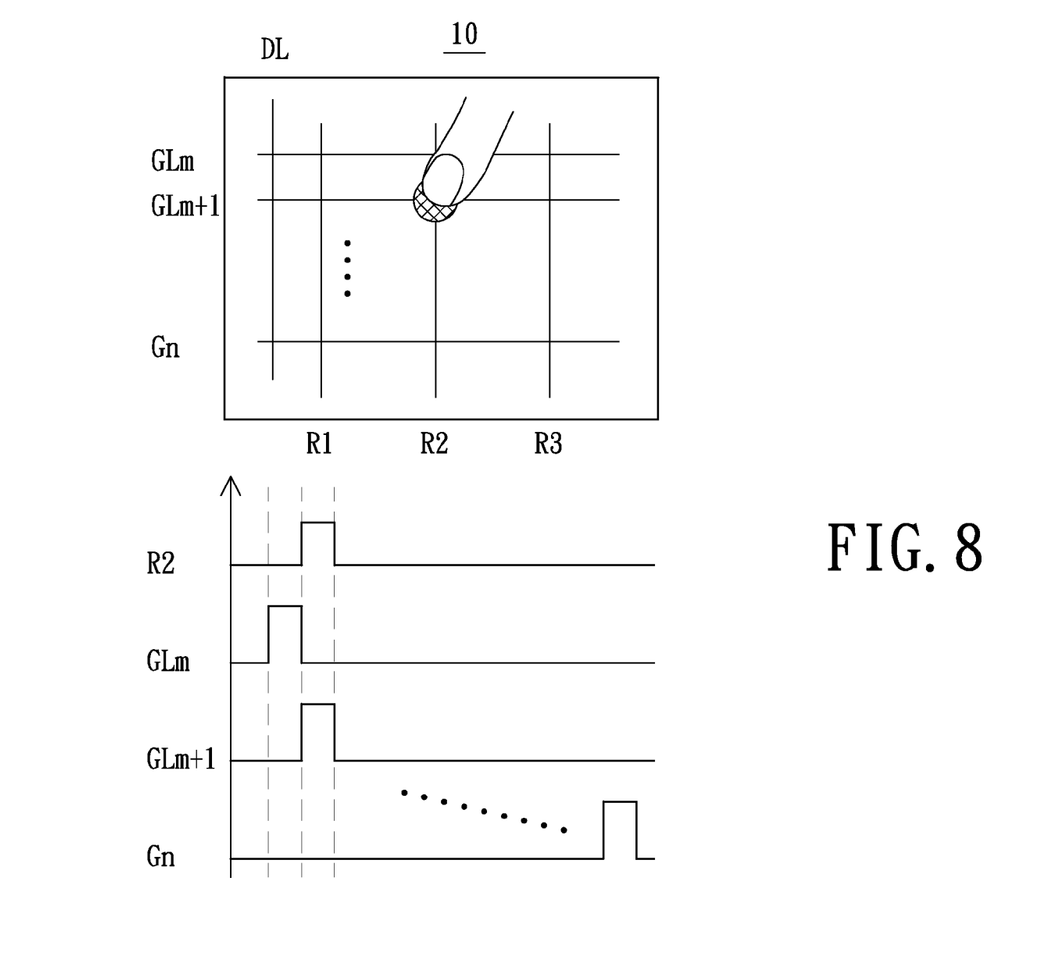
FIG. 8 illustrates a step of determining a position of a touched control unit according to a timing sequence of a waveform on a readout line, of a touch detection method in accordance with an embodiment of the present invention.
Figure 9:
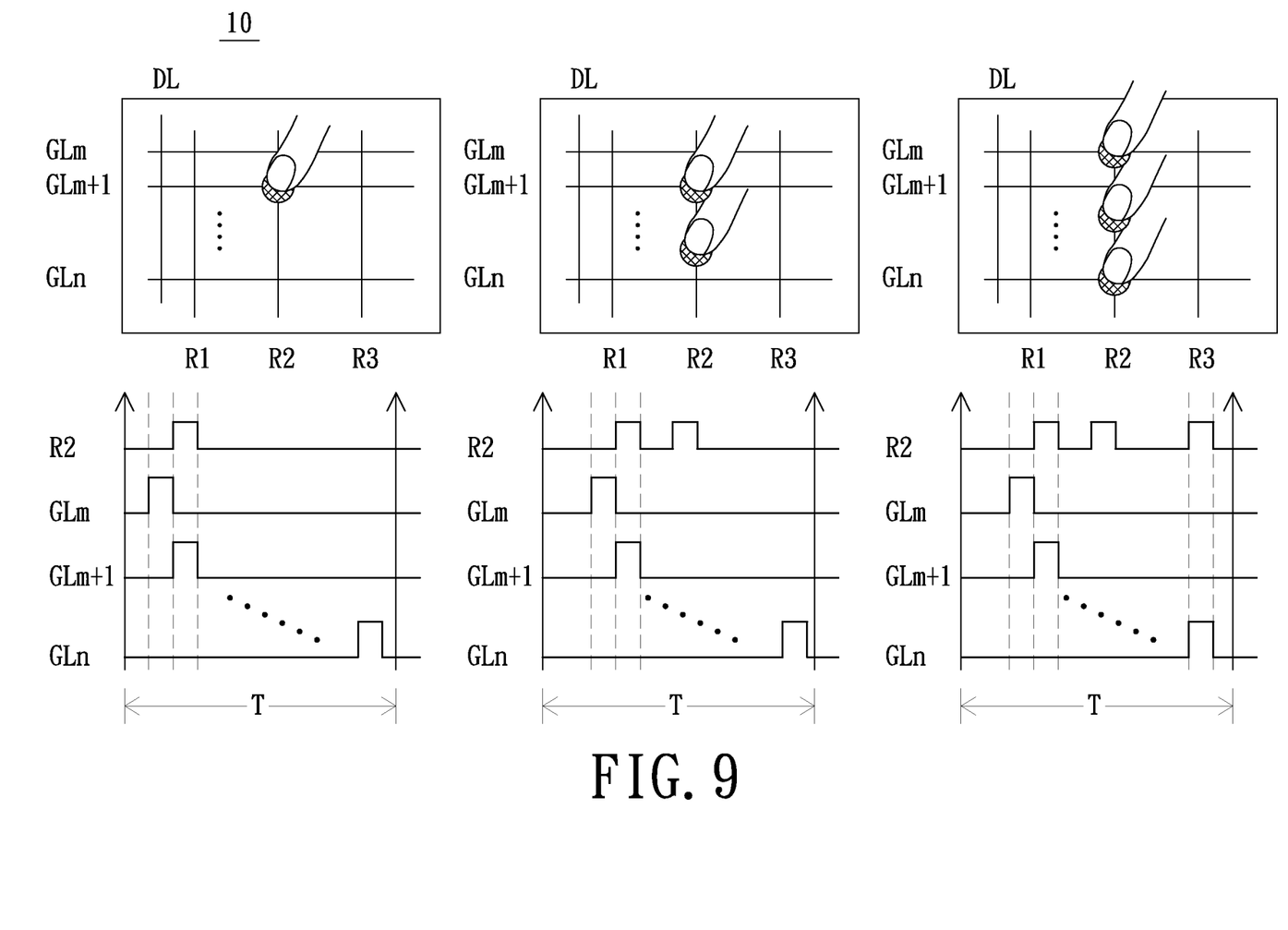
FIG. 9 illustrates a step of determining the amount of the touched touch control unit(s) according to a pulse amount in a predetermined time interval of a waveform on the readout line, of the touch detection method in accordance with the embodiment of the present invention.
Figure 10:
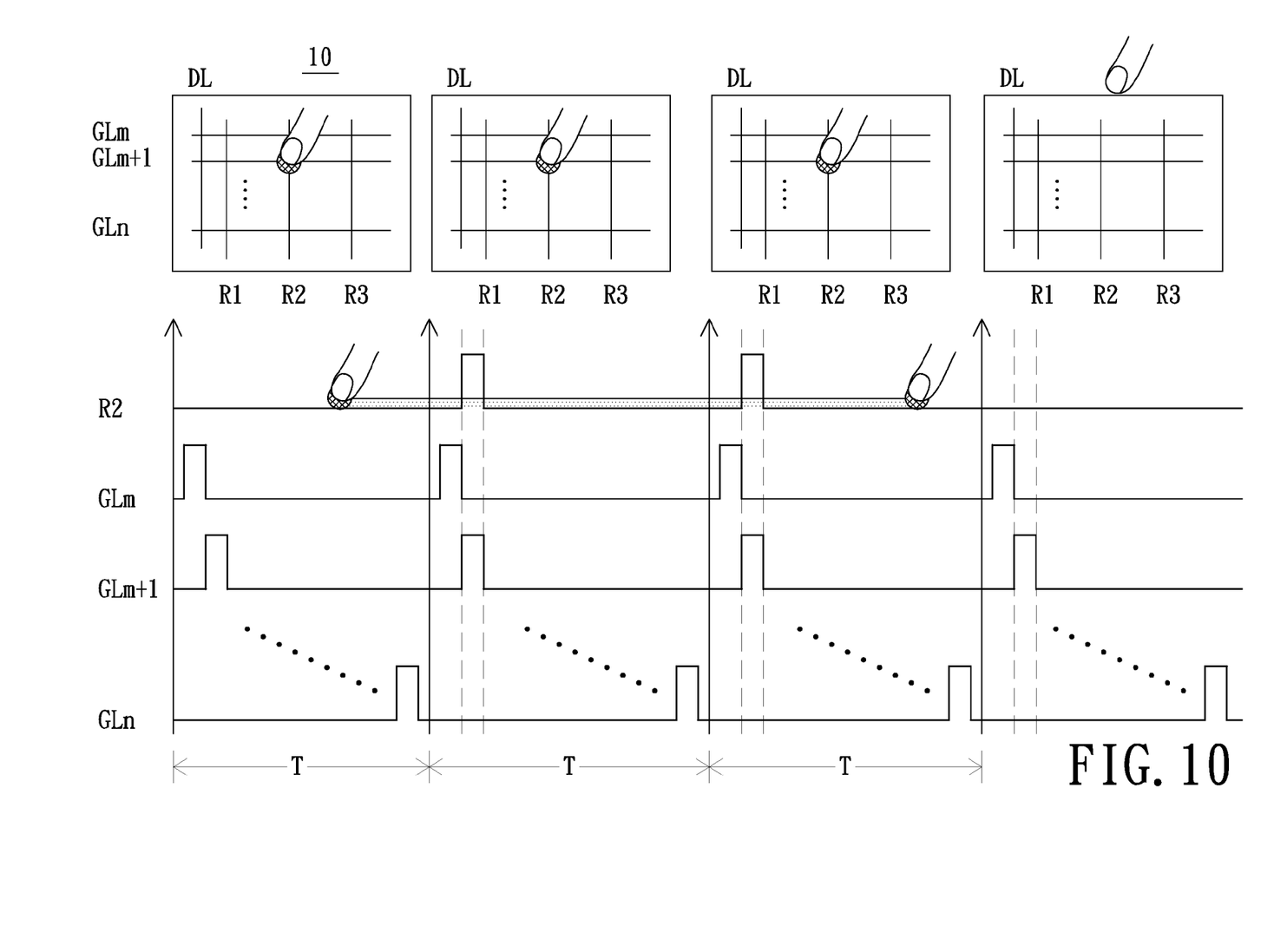
FIG. 10 illustrates a step of determining a touching time of a touched touch control unit according to a pulse amount of a waveform on the readout line corresponding to a waveform of the same gate line, of the touch detection method in accordance with the embodiment of the present invention.

Referring to FIGS. 8, 9 and 10, a touch detection method implemented on the display apparatus 10 as illustrated in FIG. 1 will be described below in detail with reference to the accompanying drawings.

As illustrated in FIG. 8, when the touch control unit of the display apparatus 10 which is electrically coupled to the gate line GLm+1 and the readout line R2 is touched, a waveform on the gate line GLm+1 corresponding to the touched touch control unit is coupled to the readout line R2. As seen from FIG. 8, a pulse of a waveform on the readout line R2 is located at a position corresponding to the waveform on the gate line GLm+1, therefore it is determined that the touch control unit electrically coupled to the gate line GLm+1 and the readout line R2 is touched according to the position of the pulse of the waveform (i.e., timing sequence of the waveform) on the readout line R2. In short, a position of a touched touch control unit can be determined according to the timing sequence of a waveform on the readout line.

As illustrated in FIG. 9, when there is only one touch control unit is touched, a waveform on the readout line R2 has one pulse in a predetermined time interval T; when there is two touch control units are touched, a waveform on the readout line R2 has two pulses in the predetermined time interval T; and when there is three touch control units are touched, a waveform on the readout line R2 has three pulses in the predetermined time interval T; and so on. In other words, using a pulse amount in a predetermined time interval of a waveform on a readout line can determine the amount of touched touch control unit(s). It is indicated that, when there are a plurality of touch control units are touched, the touched touch control units are not limited to the touch control units electrically coupled to the same readout line as illustrated in FIG. 9, and can be touch control units electrically coupled to different readout lines.

As illustrated in FIG. 10, the touch control unit of the display apparatus 10 which is electrically coupled to the gate line GLm+1 and the readout line R2 is touched, a pulse amount of the waveform on the readout line 2 which is corresponding to the waveform on the gate line GLm+1 is two, and thereby a touching time of the touched touch control unit can be determined as 2 T. That is to say, using a pulse amount of a waveform on a readout line which is corresponding to the waveform on the same gate line can determine a touching time of touched touch control unit.

In summary, in the above-mentioned embodiments of the present invention, when at least one of the touch control units is touched, by way of coupling the waveform(s) of the corresponding gate line(s) to the readout line, the position, the amount and/or the touching time of the at least one touched control unit can be determined according to the waveform on the readout line. For example, determining the position(s) of the at least one touched touch control unit according to a timing sequence of the waveform on the readout line, determining the amount of the at least one touched touch control unit according to a pulse amount in a predetermined time interval of the waveform on the readout line, and determining the touching time of the at least one touched touch control unit according to a pulse amount of the waveform on the readout line corresponding to a waveform on the same gate line. Accordingly, the display apparatuses and touch detection method in accordance with the above-mentioned embodiments can achieve multi-touch detection and thus the applications are greatly enhanced.

In addition, the skilled person in the art can make some modifications with respect to the display apparatuses and the touch detection method in the above-mentioned embodiments, for example, suitably changing the structural configuration(s) of the pixel unit and/or the touch control unit, interchanging the connections of the source electrodes and the drain electrodes of the respective thin film transistors, changing the structural configuration of the TFT array substrate, and/or changing the structural configuration of the color filter substrate, as long as such modification(s) would not depart from the scope and spirit of the present invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display apparatus comprising:
    a first substrate, wherein the first substrate comprises a gate line, a readout line and a thin film transistor, the first source/drain electrode of the thin film transistor is electrically coupled to the gate line, and the second source/drain electrode of the thin film transistor is electrically coupled to the readout line; and
    a second substrate, wherein the second substrate and the first substrate together have a liquid crystal layer sandwiched therebetween, the second substrate comprises a conductive connecting member, the conductive connecting member is preset to be electrically unconnected with a gate electrode of the thin film transistor;
    wherein when an external force is applied on the conductive connecting member, the conductive connecting member is electrically connected with the gate electrode of the thin film transistor to provide a predetermined voltage to turn on the thin film transistor and thereby a waveform on the gate line is coupled to the readout line.

2. The display apparatus as claimed in claim 1, wherein the first source/drain electrode of the thin film transistor and the gate line have a dielectric layer sandwiched therebetween and whereby a sensing capacitance is formed.

3. The display apparatus as claimed in claim 1, wherein the conductive connecting member comprises a projection member projecting from the second substrate and a conductive layer covering the projection member.

* * * * *